Oct. 15, 1935.    F. B. DOPP    2,017,234
METHOD OF HEELING SHOES
Filed Oct. 24, 1932    8 Sheets-Sheet 1

INVENTOR.
Frank B. Dopp.
BY
ATTORNEY.

Oct. 15, 1935.  F. B. DOPP  2,017,234
METHOD OF HEELING SHOES
Filed Oct. 24, 1932    8 Sheets-Sheet 5

INVENTOR.
Frank B. Dopp.
BY
ATTORNEY.

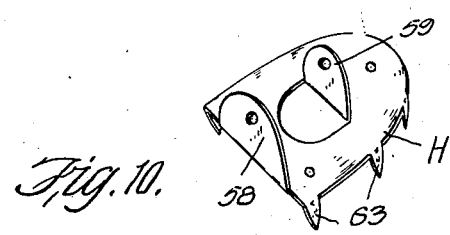
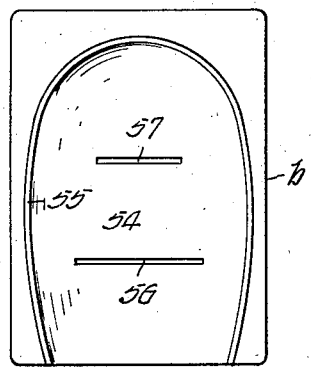
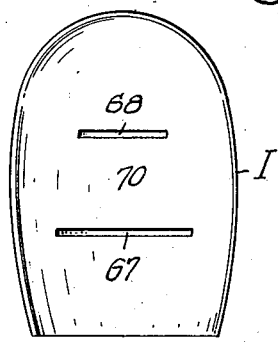
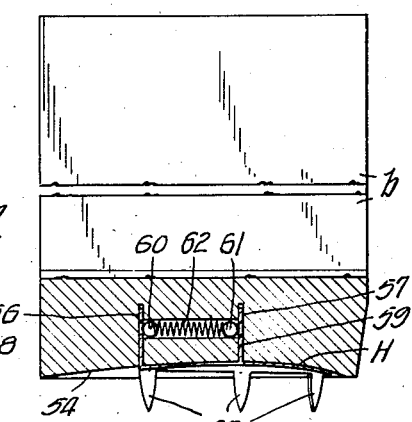
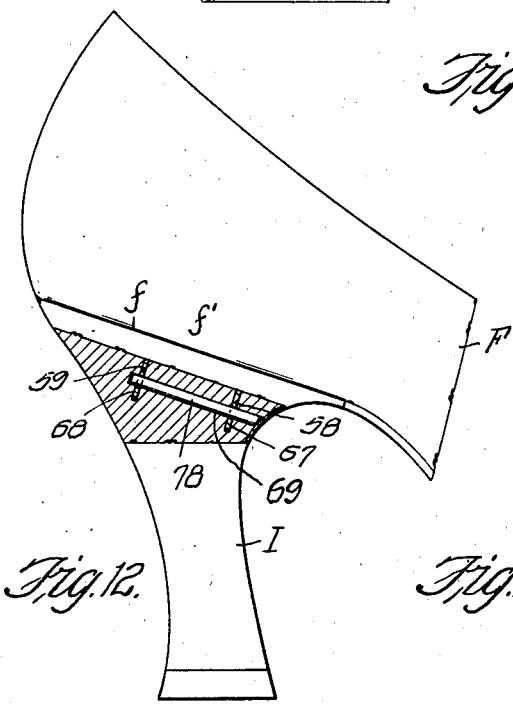
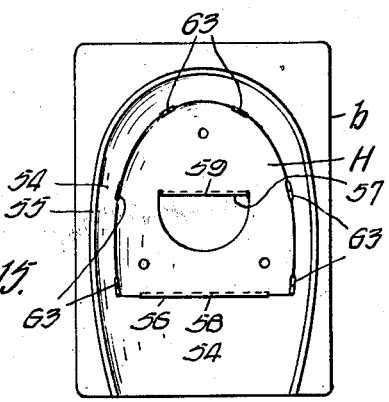

Oct. 15, 1935.  F. B. DOPP  2,017,234
METHOD OF HEELING SHOES
Filed Oct. 24, 1932    8 Sheets-Sheet 7

INVENTOR.
Frank B. Dopp.
BY
ATTORNEY.

Oct. 15, 1935.  F. B. DOPP  2,017,234
METHOD OF HEELING SHOES
Filed Oct. 24, 1932   8 Sheets-Sheet 8
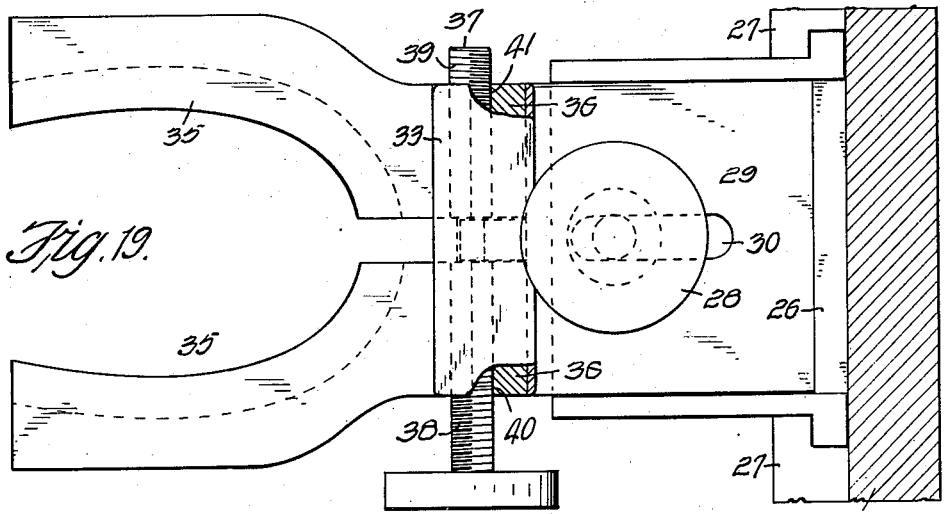
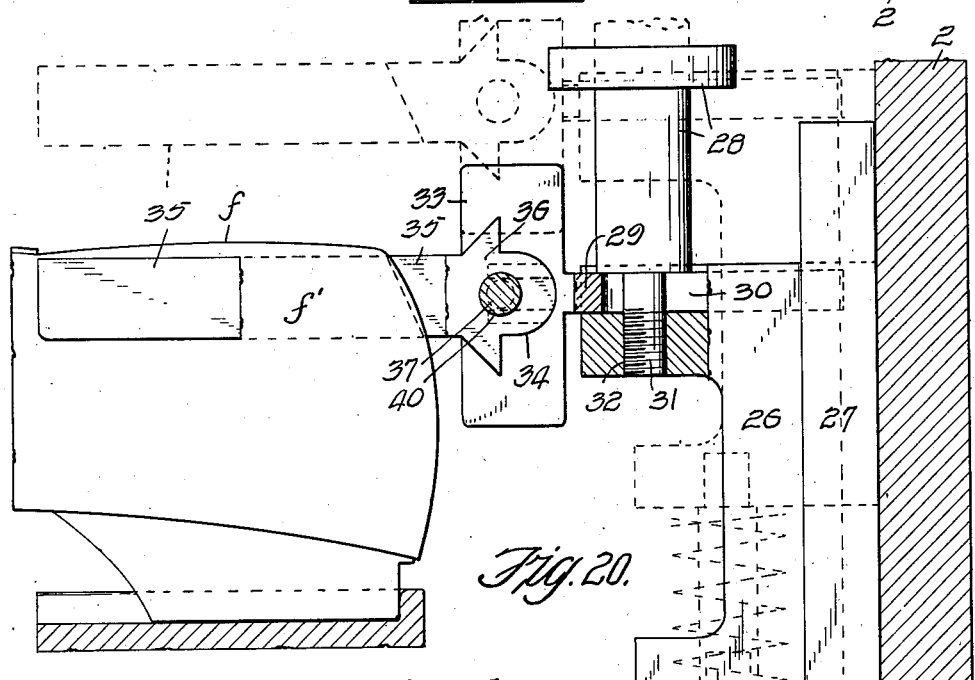
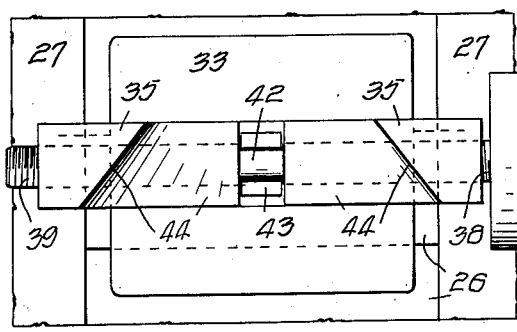
INVENTOR.
Frank B. Dopp.
BY
ATTORNEY.

Patented Oct. 15, 1935

2,017,234

UNITED STATES PATENT OFFICE 2,017,234

METHOD OF HEELING SHOES

Frank B. Dopp, St. Louis, Mo., assignor, by mesne assignments, to Perma Corporation, Chicago, Ill., a corporation of Illinois Application October 24, 1932, Serial No. 639,221

16 Claims. (Cl. 12—147)

This invention relates to the art of manufacturing shoes, and has special reference to the art of heeling shoes. The invention also relates to and includes a new method of securing heels to shoes without the use of nails driven through the heel seat material of the shoe and into the heel in the usual manner, but which are interlocked with embedded parts of a heel seat plate that is secured to the heel seat of a shoe by suitable means, such as prongs integral therewith, or by nails, if desired. And the invention is particularly directed to a method of and machine for fitting the heel seat of a shoe, applying and securing a heel seat plate to the heel seat of the shoe and applying a locking-pin to the heel for interlocking engagement with parts of the heel seat plate.

As compared with the hereinafter described invention, the present day methods of securing wooden heels to ladies' shoes, are slow, laborious and wasteful; wasteful from the standpoint of the breakage of wooden heels by the driving of nails into same for securing them to the heel seats of shoes, which often causes them to split, rendering the heel unfit for use, and if the split heel is not discovered at the factory, it is quickly discovered when the purchaser of the shoes walks on them, as a split heel soon becomes loose and either falls off of the heel seat, or a section of the heel is severed from the remainder thereof.

Among the objects of the invention are the following: To apply heels to shoes that are more securely held in position than when they are nailed to the shoes; to apply heels to shoes without the customary waste caused by splitting of heels during the nailing operation; to secure heels to shoes at less cost than has been possible heretofore; and, to carry out the operations of heeling shoes, in a series of steps, namely, fitting the heel seat by first die cutting the extended heel portion of the outsole; second, applying and securing, in a single operation, a pronged and apertured eared plate to the heel seat of the shoe and simultaneously therewith shaping the heel seat; third, applying an adhesively coated heel to the heel seat of the shoe with the apertured ears thereof receivable in spaced transverse slots in the heel seat surface of the heel; and fourth, holding the heel under pressure while applying a lock-pin to a breast opening in the heel for interlocking engagement with the apertured ears of the heel seat plate to securely lock the heel to the shoe.

As more fully described hereinafter, I attain these and other objects and results by a series of steps, or operations carried out on a series of similar machine units constituting as a whole, a heeling machine, capable of carrying out all of the operations necessary, either by a single operator, or a plurality of operators, as desired.

The novel shoe heeling machine herein described comprises a plurality of mechanisms and organizations of mechanisms by which heel seats are prepared, or initially fitted by die cutting an overlapping heel portion of the outsole of the shoe, then providing the fitted heel seat with a heel seat plate and simultaneously therewith shaping, or preparing the heel seat for the application of a heel thereto and the applied heel then held under pressure while simultaneously applying a locking pin to the heel for locking the heel to the heel seat plate against displacement upon the heel seat of the shoe.

More specifically, but briefly defined, the machine or apparatus which in one form, comprises a plurality of units one of which units embodies a shoe support, a heel seat fitting and a shoe gauging device; another unit embodying a shoe support, a heel seat plate holder and final heel seat shaping device, and a shoe gauging device; and, a third unit embodying a heel hold-down device and a lock-pin positioning device.

The invention contemplates, though it is not so limited, a machine whereby the machine elements performing operations on the shoe, the heel seat plate and the heel, are brought about by the aid of fluid pressure while the lock-pin operation is brought about by the aid of pressure.

The various operating parts by which the several stages in the heeling of shoes is accomplished, are simple in construction and operation and the machine has all of its operating parts and mechanisms combined and arranged in compact form, and all cooperating to heel shoes at a maximum rate of speed, the various parts, however, being removable and adjustable so that the machine, as a whole, possesses the widest range of adaptability to heeling shoes of various shapes and sizes.

The invention also consists of several primary and secondary combinations of parts co-acting to produce the necessary results, all as hereinafter described.

The present invention will generally be used in connection with the devices disclosed in the pending application of August G. Eichhorn, Serial Number 603,995, filed April 8th, 1932.

The invention will be more readily understood by reference to the accompanying drawings, forming part of this specification, and in which the method as practiced in the machine, or apparatus, which is found as one type of machine suited to the purposes of the invention.

Fig. 10 is a perspective view of the heel seat or heel attaching plate.

Fig. 11 is a top plan view of a shoe heel showing the transverse slotted recesses therein for receiving apertured ears of the heel seat plate.

Fig. 12 is a detail showing a shoe heel locked to the heel seat portion of the shoe by means of the heel seat plate and a locking pin.

Fig. 13 is a bottom plan view of the heel seat plate holder and heel seat former.

Fig. 14 is a view partly in side elevation and partly in sectional elevation of the heel seat plate holder and heel seat former showing a heel seat plate applied thereto.

Fig. 15 is a bottom plan view of the heel seat plate holder and heel seat former showing a heel seat plate applied thereto.

Fig. 19 is a top plan view of the shoe counter and heel seat gauge mounted on a support.

Fig. 20 is a side elevation of the shoe counter and heel seat gauge device mounted on a support.

Fig. 21 is a front elevation of the shoe counter and heel seat gauge device.

Figure 1:
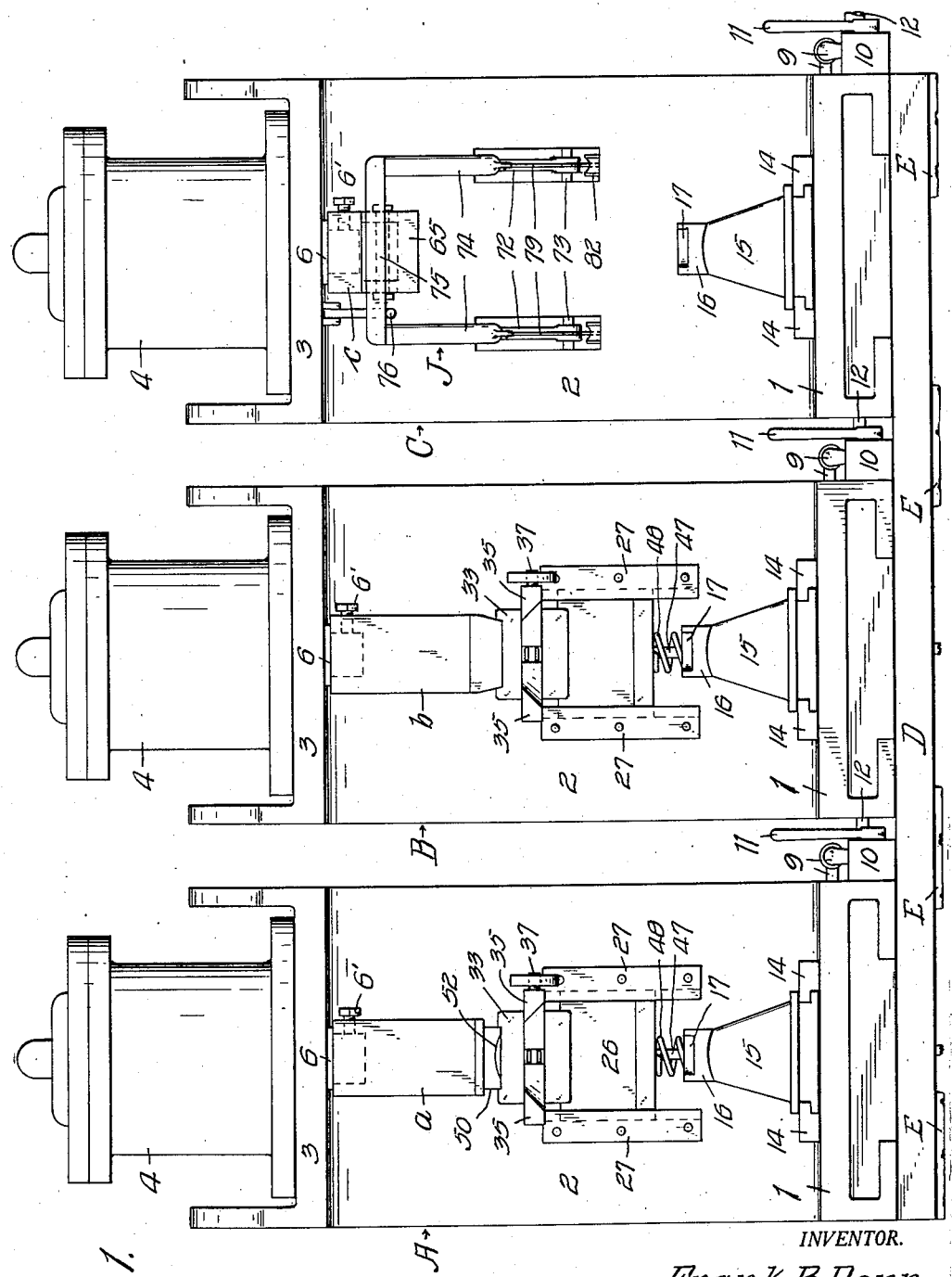
Fig. 1 is a view in front elevation of the three machine units constituting a shoe heeling machine as a whole.

To the end that every detail of the method of heeling shoes, as practiced with the herein shown units and tools, may be more certainly understood, the construction and operation of the units, or mechanism and the tools will now be more fully described.

In the drawings, the several units employed which constitute the heeling machine and by which the several tools are carried and whereon and by which most of the several steps of the method are conducted and carried out, A designates, generally, the outsole cutting unit for shaping, or fitting the heel portion to the desired shape to conform to the shape of the heel seat of a shoe; B designates, generally, the heel seat plate unit which applies and secures the heel seat plate to the heel seat of the shoe; and, C designates the heel hold-down and lock-pin positioning unit of the heeling machine.

The three units employed, are shown in Fig. 1, as positioned on a table D provided with supporting legs E, or, if desired, the units may be suitably spaced upon the customary work bench used in shoe factories. Unit A may if desired, be located remote from the other two units B and C. Units B and C are preferably positioned adjacent one another. The units may be operated by a single operator, or by two, or three operators, as is manifest.

Figure 2:
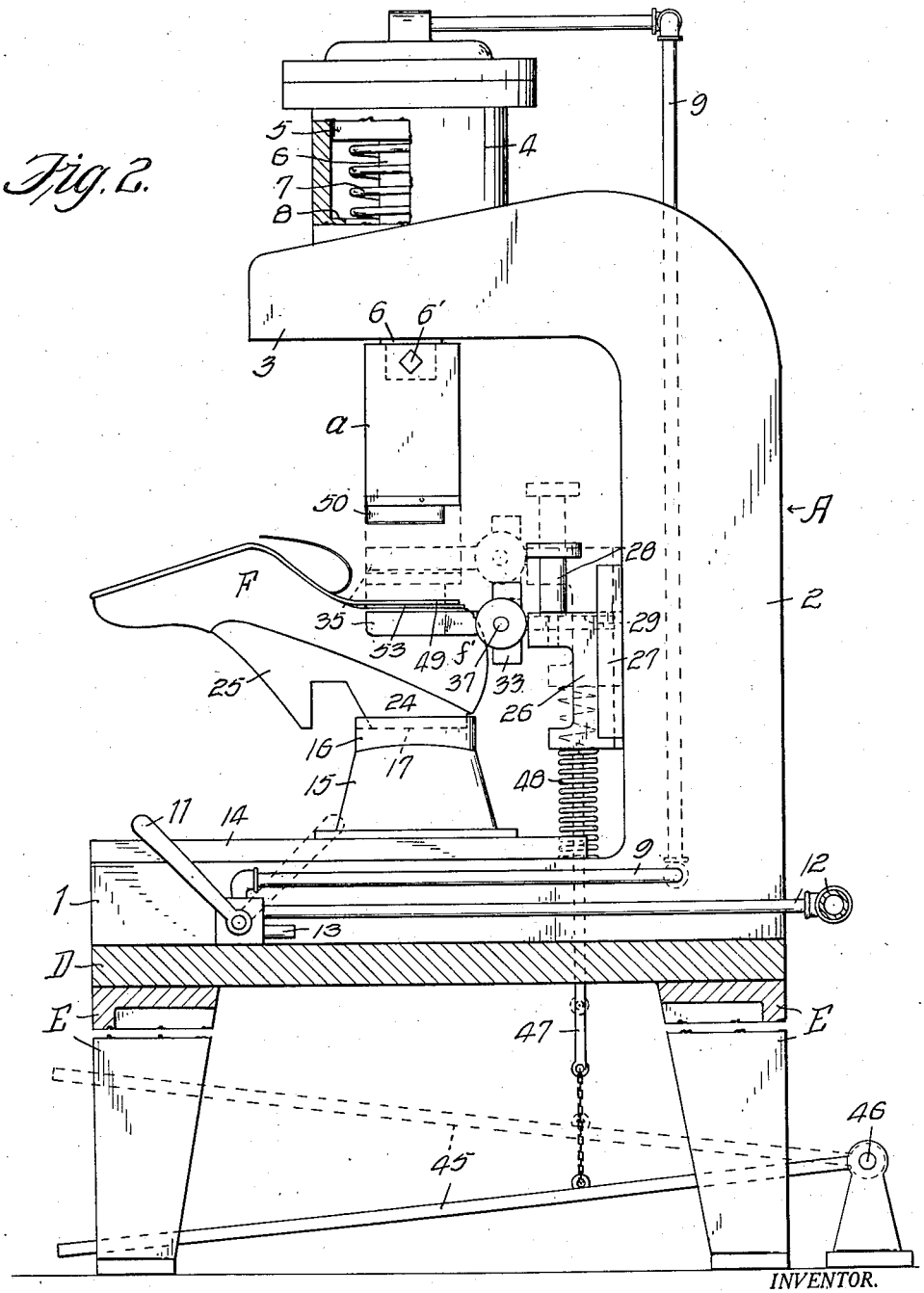
Fig. 2 is a side elevation of the sole cutting machine unit, the supporting table being shown in sectional elevation.
Figure 3:
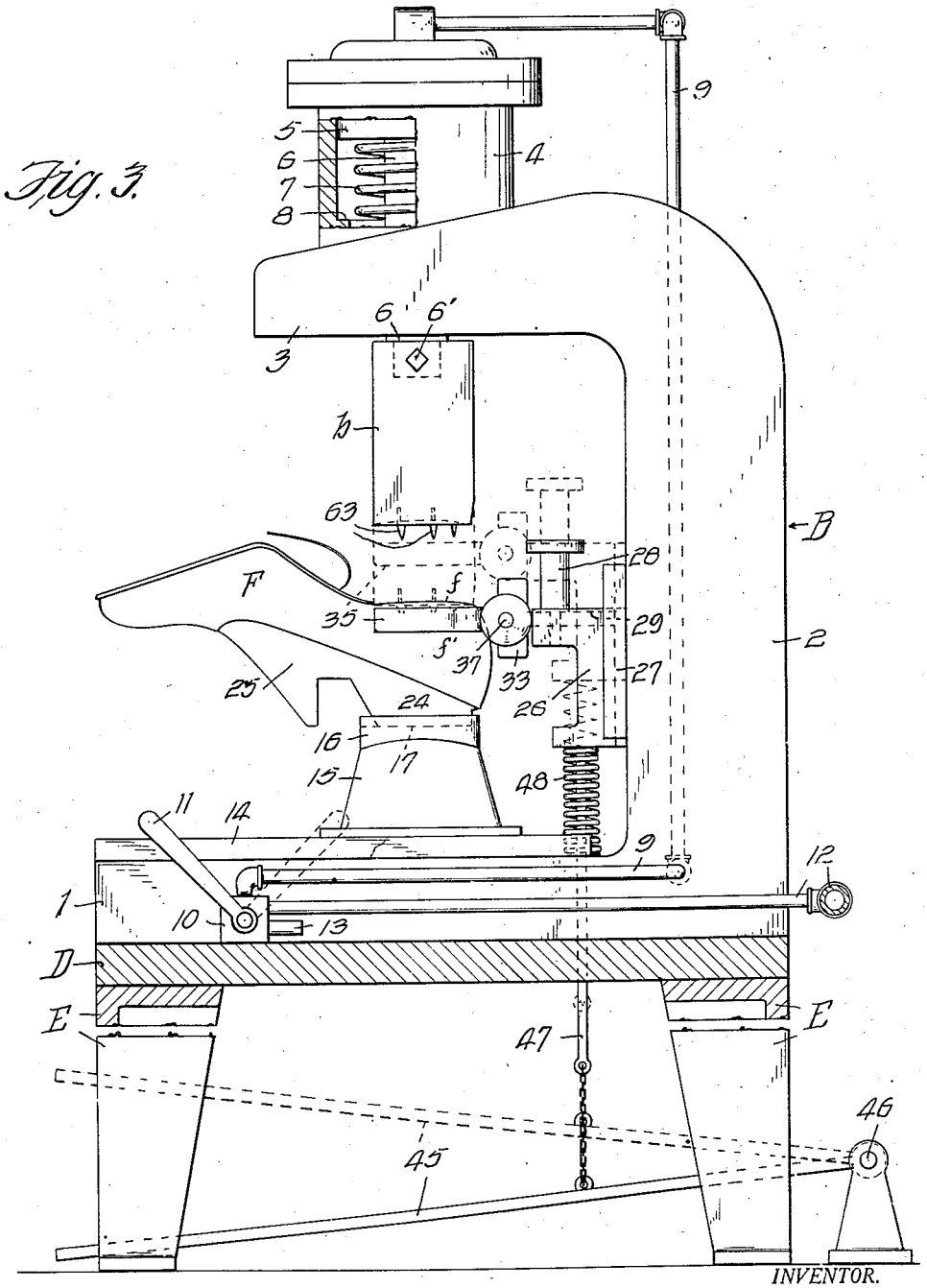
Fig. 3 is a side view of the heel plate attaching and heel seat forming machine unit, the supporting table being shown in sectional elevation.
Figure 4:
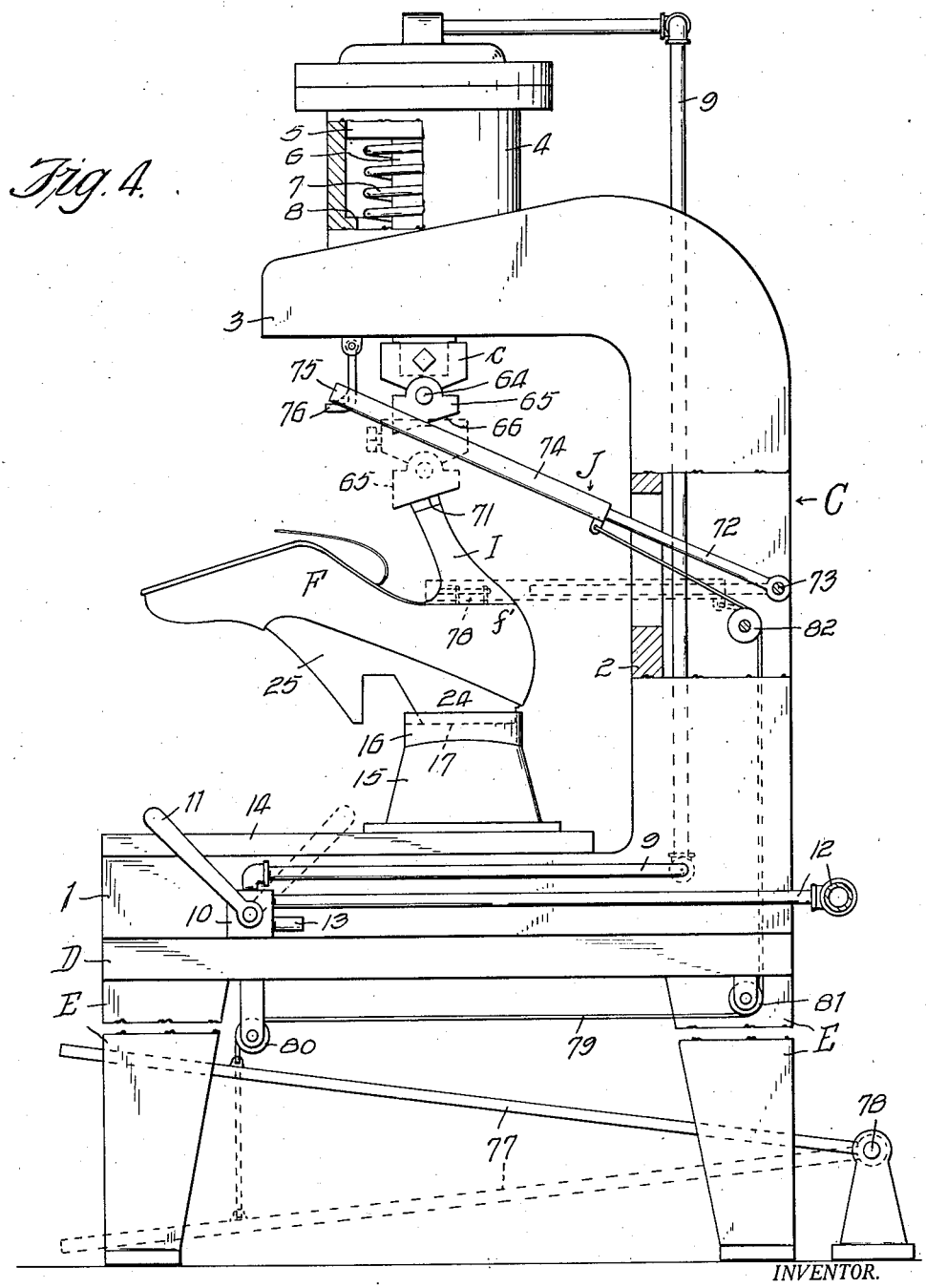
Fig. 4 is a side elevation of the heel hold-down and lock-pin positioning unit of the machine.

Each unit of the device, or apparatus for carrying out the invention is shown in one form as consisting of a suitable stand embodying a base 1, an upright 2 having a laterally directed arm 3 disposed a suitable distance above the base 1 and a plunger device. Each plunger device embodies a suitable cylinder 4 supported by the arm 3 of its respective unit, a piston 5 workable therein and a non-rotatable ram, or rod 6 depending from the piston and directed through the bottom of the cylinder to a suitable point therebelow. Each plunger is provided at its lower end with a suitable removable head, these heads being designated a, b and c on their respective units A, B and C and held in position in their respective plungers or rams by suitable fastening means 6'. The piston 5 within each cylinder is moved upwardly by the action of a suitable spring 7. The piston in each cylinder is responsive to fluid pressure for moving the ram associated therewith downwardly, and each piston is stopped in its downward movement, under pressure, within its respective cylinder by means of a suitable cylinder wall shoulder 8. The fluid pressure for moving the pistons downwardly is directed into the top of each cylinder by means of a suitable conduit 9 and the fluid pressure to each cylinder is controlled by a suitable two-way valve 10. There are three of these valves, one for each unit, as shown in Figs. 2, 3 and 4.

When the valve handle 11 of the valve of either unit is in one position, the valve is closed to the passage of fluid pressure therethrough from a feed conduit 12 and into its respective cylinder, and when the valve handle of the valve of either unit is moved to its other position the fluid pressure within its respective cylinder is exhausted, as at 13, which allows the piston within the cylinder affected to be raised by the action of the spring within the affected cylinder.

The means for supporting a lasted shoe on the several machine units, will now be described.

A pair of suitable guides 14 are fixed on the base 1 of each machine unit. A suitable lasted shoe support 15 is mounted for sliding movement on the base 1 of each unit between the guides 14 so that each support can be moved toward and away from its respective upright 2. When operatively positioned, each support 15 is disposed below the plunger 6 of each unit, as shown in Figs. 2, 3 and 4. Each support 15 is provided with a suitable swivelly mounted head 16 having a recess 17 open at its forward end. The lower surface of each head 16 is suitably concaved, or longitudinally and transversely curved, as at 18, and the upper surface of each support 15 is suitably convexed, or longitudinally and transversely curved, as at 19. Each support is provided with a suitable opening 20. Each head 16 is held on its support 15 by means of a depending pin 21 insertable through the opening 20. A suitable spring 22 encircles the pin and is interposed between the apertured top of the support 15 and a stop 23 carried by the pin. The recess 17 of each head 16 is adapted to receive a part 24 of a shoe last 25 to be supported by the recessed heads 16, first by the head 16 of unit A, second by the head 16 of unit B, and third, by the head 16 of unit C, in order to carry out the several steps of the invention.

A shoe, designated generally, as F, to be heeled, is supported by the last 25, as clearly illustrated. The heel seat of the shoe F is designated f.

The gauge mechanism for locating the shoe counter and the heel seat of a shoe in proper position relative to the plunger, or ram of the machine units A and B, includes a suitable supporting member 26 adapted to be mounted for vertical movement between suitable guides 27 on the upright 2 of said machine units. Mounted for horizontal adjustment on the support 26 and locked thereon in any of various adjusted positions by suitable locking means 28, is a suitable plate 29 having a slot 30.

A screw threaded end 31 of the locking means 28 passes through the plate slot 30 and is receivable in a screw threaded opening 32 in the support 26. The forward end of the plate is provided with a suitable head 33, as shown in Fig. 20, and the head is provided with a suitably shaped transverse recess 34. Associated with the head 33 are a pair of suitable gauge arms 35, the rear ends of which are provided with suitable heads 36 shaped to conform to the plate head recess 34, and said heads are so shaped as to prevent movement of the gauge arm heads in any direction but toward and away from each other. The gauge arms are moved toward and away from each other by means of a stem 37 having right and left handed screw threads 38 and 39. The screw threaded ends of the stem 37 are receivable in screw threaded openings 40 and 41, respectively, in the heads 36 of the gauge arms 35. The stem 37 midway its ends is non-screw threaded and reduced in diameter, as at 42, and this non-screw threaded section of the screw stem 37 is held in a suitable bearing 43 to prevent longitudinal movement of the screw stem 37 relative to the gauge arm heads 33.

The gauge arms 35 are shaped to conform to the counter of a shoe and the inner side faces thereof are beveled as at 44 between the inner end of the heads 36. The gauge arms are adapted to straddle the shoe counter below the heel seat of the shoe. The shoe counter is designated f' in Fig. 20. When the screw stem is turned clockwise, the gauge arms 35 are moved away from each other and when turned anticlockwise, the gauge arms are moved toward each other. Thus, the gauge device can be adjusted to accommodate any size of shoe counter.

The gauge devices of units A and B serve to locate the desired position of the heel seat of the shoe relative to the plungers of said units, and to prevent bulging or spreading of the shoe counter when pressure is applied to the heel seat f, as will be fully described hereinafter in the several steps or operations necessary to carry out the heeling operations. Each unit A and B includes a suitable foot pedal 45 pivoted as at 46, and the foot pedals 45 are connected with their respective guided supports 26 through the medium of suitable connections 47, which connections are encircled by means of suitable coiled expansion springs 48 disposed below the guided supports 26 and the bases 1 of units A and B. The springs 48 normally hold the gauge mechanisms in their uppermost positions relative to the lasted shoe supports, as shown in dotted lines in Figs. 2, 3 and 20.

*Sole cutting die and operation of machine unit A*

Figure 5:
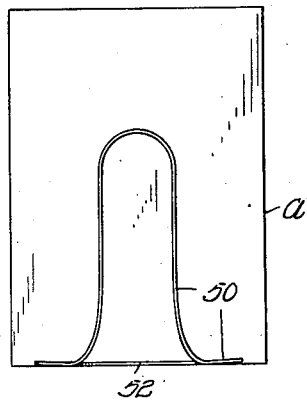
Fig. 5 is a bottom plan view of the cutting die on its holder for shaping the heel seat portion of the outsole.
Figure 6:
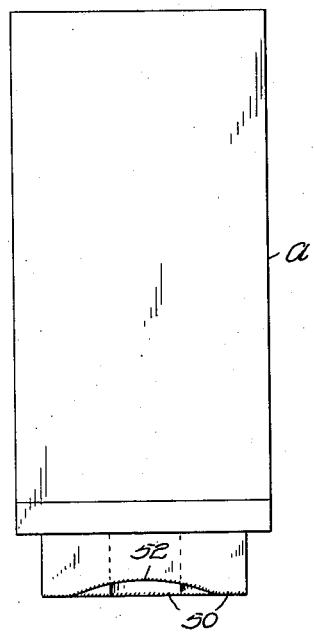
Fig. 6 is a front elevation of the cutting die and the holder therefor.
Figure 7:
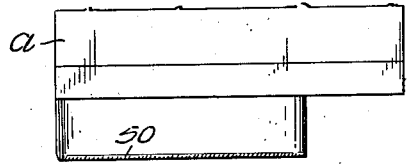
Fig. 7 is a detail in side elevation of a part of the cutting die holder and the cutting die.
Figure 8:
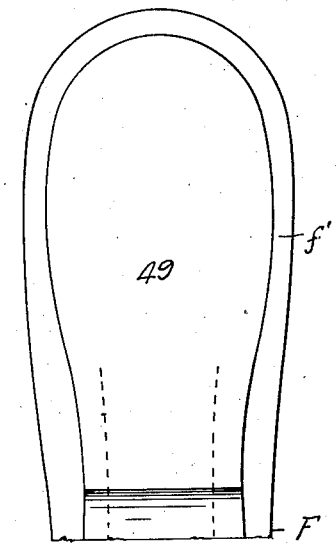
Fig. 8 is a bottom plan view of the heel portion of a shoe showing the heel portion of the outsole before it is finally shaped by the cutting die.

The means for cutting the extending or enlarged heel portion 49 of the outsole of the lasted shoe, a detail of which is shown in Fig. 8, comprises, as shown in Fig. 5, a suitable cutting blade 50 carried by the holder a on ram 6 of unit A. The cutting blade 50 cuts the enlarged heel portion 49 of the outsole to the desired shape and size, designated 49' in Fig. 9. The sole is also split transversely, as at 51 by means of a concaved cutter blade 52, to provide a gauge line 52' for the forward edge of the heel seat surface of a shoe heel to be later applied to the heel seat of the shoe. In the sole cutting operation, the operator mounts the lasted shoe F upon the head 16 of support 15, then applies foot pressure to the foot pedal 45 associated with unit A, thereby moving downwardly the gauge members 35, which are shaped and beveled, as at 44 to conform with the contour of the shoe counter, into contact with the counter of the shoe to locate the heel portion of the shoe relative to the cutting die. Either before, or after this foot operation, a metallic plate 53 is inserted between the uncut heel portion 49 of the outsole of the shoe and the heel seat portion of the shoe counter f', and thereafter, the operator then opens the two-way valve 10 associated with unit A by moving lever 11 to dotted line position, causing fluid pressure to enter cylinder 4 of unit A, thereby forcing the plunger 6 of unit A and the cutting die associated therewith, downwardly to cause the cutting die to cut the heel portion 49 of the outsole to the desired heel seat shape and size 49', which shape is shown in detail in Fig. 9. The valve 10 is then closed and the fluid pressure is exhausted due to the spring in cylinder 4 of unit A moving the piston and its plunger to their uppermost positions.

After the cutting die operation is completed, the foot pedal 45 of unit A is released and the gauge arms 35 are automatically elevated. The lasted shoe is then removed from the head 16 of support 15 associated with unit A and remounted on the head 16 of support 15 associated with machine unit B.

*Plate carrying tool and operation of machine unit B*

Figure 9:
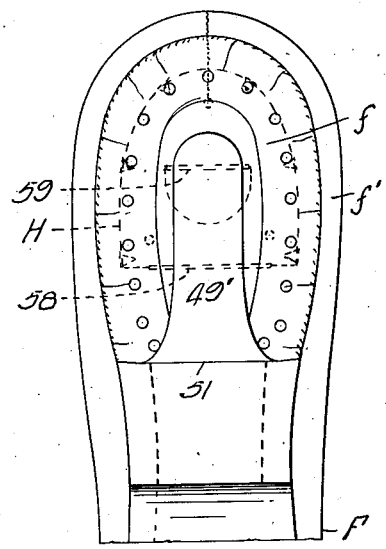
Fig. 9 is a bottom plan view of the heel portion of a shoe showing the heel portion of the outsole shaped to form and also showing in dotted lines the relative position of the heel seat plate.
Figure 16:
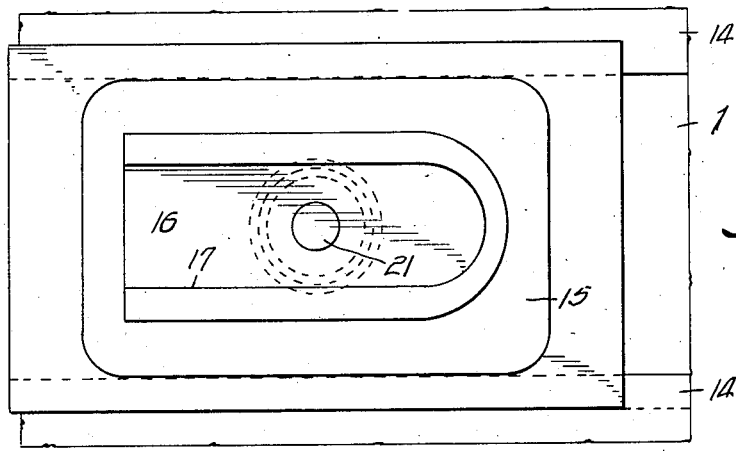
Fig. 16 is a top plan view of the lasted shoe support mounted on a base.
Figures 17, 18:
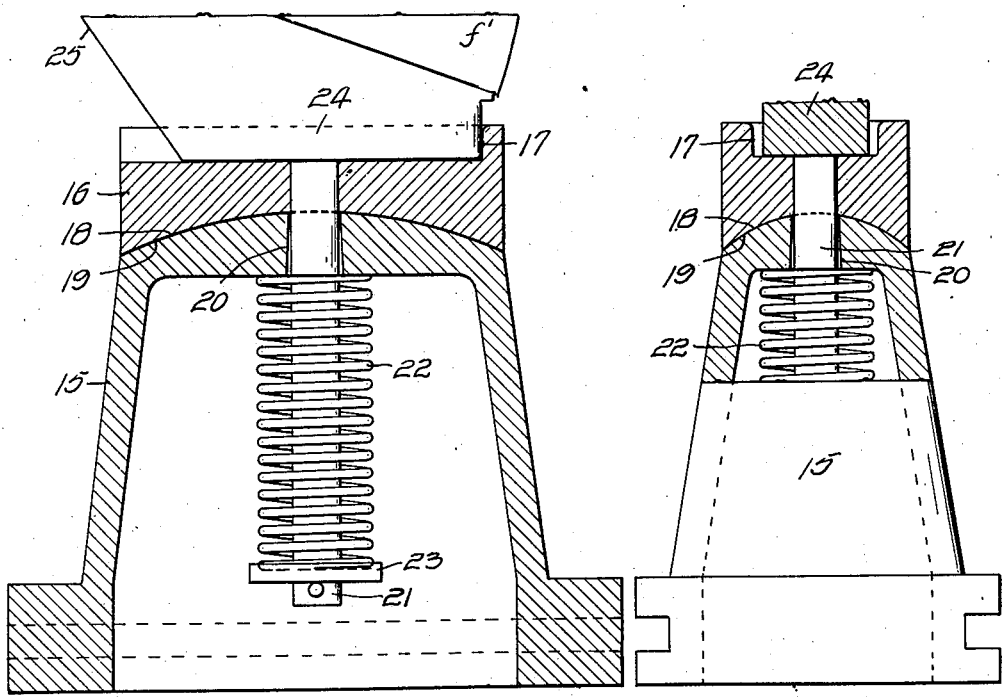
Fig. 17 is a vertical sectional view of the lasted shoe support.
Fig. 18 is a view partly in sectional elevation and partly in end elevation of the lasted shoe support or jack.

Machine unit B is adapted to apply and secure a heel seat plate H shown in detail in Fig. 10, to the heel seat f of the lasted shoe and to finally shape or form the heel seat for the application of a heel thereto. The means for performing this operation in the several steps of heeling a shoe, comprises the plate holder b removably secured to the lower end of the plunger 6 of machine unit B. The plate holder b is provided with a suitable concaved lower face 54 and a plane surface 55 for finally shaping, or forming the heel seats simultaneously with the applying of the heel plate to the heel seat of the shoe. The holder b, as shown in Figs. 8 and 9, is provided with a pair of suitable transverse slotted recesses designated 56 and 57 into which is inserted the apertured ears 58 and 59, respectively, of the heel seat plate H and which ears are frictionally, but removably held in said slotted recesses 56 and 57 by two balls 60 and 61, respectively against which a spring 62 exerts end pressure, as shown in Fig. 14. The heel seat plate H, besides the apertured ears, carries a plurality of marginal prongs 63 directed opposite to the apertured ears 58 and 59, as shown in Figs. 10 and 14. The plate H may, or may not be placed on the holder b before or after the following shoe counter gauging operation.

In the shoe gauging operation on unit B, the operator applies foot pressure to the foot pedal 45 of unit B, thereby moving downwardly, from dotted line position in Fig. 3, the gauge arms 35 of unit B, which are like the gauge arms 35 of unit A, into contact with the counter f' of the lasted shoe to properly locate the position of the heel seat portion f of the shoe relative to the heel plate holder b. The operator then opens the valve 10 by moving lever 11 to dotted line position, associated with unit B, causing fluid pressure to enter the cylinder 4 of unit B, thereby actuating the piston therein and forcing the plunger 6 associated therewith and the plate holder b downwardly to cause the prongs 63 of the heel seat plate H to penetrate the heel seat material of the shoe positioned therebelow, which prongs are clinched by coming into contact with the heel surface of the last upon which the shoe F is lasted. After the plate applying and securing operation, the operator closes the valve 10 associated with unit B and the fluid pressure within the cylinder of unit B is exhausted due to the spring within the cylinder moving the plunger and plate holder to their uppermost positions, minus the heel seat plate H. After the heel seat plate seating operation, the operator releases foot pedal, of unit B, and the gauge arms 35 of unit B are automatically elevated to their uppermost position, as shown in full lines in Fig. 3. The lasted shoe with the heel seat plate H applied thereto is then removed from the head 16 of support 15 of unit B and remounted on the head 16 of support 15 of machine unit C.

*Heel hold-down tool, lock-pin positioning mechanism and operation of machine unit C*

Machine unit C is adapted to apply hold-down pressure to a heel positioned in the apertured eared plate and the heel seat of the shoe of which it forms a part, and, unit C also includes mechanism for forcing the lock-pin to home position within the shoe heel applied to the heel seat of the shoe.

The means for performing the heel hold-down operation comprises a suitable holder c removably secured to the lower end of the plunger 6 associated with the cylinder of machine unit C. Suitably and adjustably connected, such for instance, as by suitable locking means 64 to the holder c is a pressure plate 65 having an inclined surface 66. Prior to the operation of the plunger of unit C in a downward direction to the dotted line position in Fig. 4, the operator applies a suitable wooden heel I having the transverse slotted recesses designated 67 and 68, as clearly shown in plan view of a heel shown in Fig. 11, to the heel seat plate H with the apertured ears 58 and 59 insertable in the heel recesses 67 and 68, respectively. The heel I is also provided with a breast opening 69 which intersects the heel seat recesses 67 and 68, as shown in Fig. 12. The heel seat surface 70 of the heel I may or may not be coated with a cement or suitable adhesive before applying the heel, by hand, to the heel seat plate H. After the heel has been positioned, as described, the operator opens the valve 10 on unit C by moving lever 11 to dotted line position, causing fluid pressure to enter the cylinder, associated with unit C, thereby forcing the plunger and the pressure plate 65 carried thereby downwardly so that the pressure plate will exert sufficient pressure against the tread surface 71 of the heel I to cause the breast opening 69 thereof to register with the apertured ears 58 and 59 of the heel seat plate H.

After this operation of unit C and while pressure is still applied to the heel, the operator manipulates the lock-pin positioning mechanism associated with unit C, which mechanism includes a swingable U-shaped telescopic frame designated generally as J. The frame members 72 are pivoted to the upright 2 of unit C, as at 73 and the tubular members 74 of the frame are mounted for sliding movement on the members 72. The members 74 are connected at their forward ends with a suitable cross-piece 75, serving as a plunger, which in inoperative position is supported by a suitable hanger 76 adjacent the forward side of the plunger 6 of unit C, and in operative position is lowered to a position in advance of the breast portion of the heel I, as shown in dotted lines in Fig. 4. A suitable foot pedal 77 is pivotally supported as at 78 below unit C and the pedal 77 is connected by means of cables or the like 79, riding over pulleys 80, 81 and 82, to the rear ends of the tubular side frame members 74, so that when foot pressure is applied to the pedal 77, movement of the cross-piece 74 is directed toward the breast of the heel I for forcing a lock-pin 78, which has been positioned in the mouth of the breast opening 69 into the breast opening for interlocking the pin 78 with the apertured ears 58 and 59 of the heel seat plate H for securely locking the heel I to the heel seat f of the shoe and against possible displacement thereon, or removal therefrom, without first removing the lock-pin 78.

After the lock-pin 78 has been forced home for securely locking the heel to the shoe through the medium of the heel seat plate, the operator releases the foot pedal 77 and swings the forward end of the lock-pin positioning mechanism J upwardly for connection with its hanger 76. The heeled shoe is now removed from the head 16 on the support 15 of unit C and the hereinedescribed steps, or operations of heeling a shoe are then repeated, either by a single operator, or a plurality of operators.

From the foregoing description, it will be evident that the several successive steps or operations of heeling a shoe, are carried out in series, the outsole heel cutting operation being performed on unit A, the plate applying and securing operation, as well as the final heel seat forming operation being performed on unit B, and heel applying, heel holding and lock-pin operations being performed on unit C. While I have shown and described the steps or operations as carried out on three separate units of a heeling machine, it is apparent that all of the steps of the method of heeling a shoe could be carried out on one unit of the machine, particularly unit C, when provided with a shoe gauging device, but in such instance, the tools or devices as now carried by the plunger of the three units would have to be interchanged on the plunger of a single machine unit.

From the foregoing description, it is apparent that I permanently fasten the attaching plate to the prepared heel seat of the sole, then apply the heel and attaching plate to the heel seat under suitable pressure, insert a locking pin in the bore of the heel and through the transverse openings in the attaching plate tangs while the heel is under pressure, and thereafter, releasing the pressure on the heel and utilize the resiliency of the metal attaching plate and the natural tendency of the heel to spring outwardly, to bind the locking pin in the tangs on the attaching plate in such a way that the heel is clamped rigidly against the attaching plate and the heel seat portion of the sole adjacent the edge of the attaching plate.

While I have shown and described, in detail, three specific forms of units which may be used in connection with the invention, it is obvious that other forms of units may be employed, either positioned side by side, as illustrated, or remote from one another, as best suited to meet the factory conditions. It will be obvious that the specific construction of the cutting tool for die cutting the heel portion of an outsole, used in the method hereindescribed, may be modified without departing from the salient features of the invention. It will be observed that the shoe gauging device associated with units A and B for properly positioning, centering or equalizing the heel portion of the shoe relative to the cutting die, as used in the method hereindescribed, may be modified without departing from the salient features of the invention. It will also be observed that the jack or lasted shoe support of all units used in the method hereindescribed, may be modified without departing from the salient features of the invention. It is to be observed that the heel seat plate holder, used in the method hereindescribed, may be modified without departing from the salient features of the invention. It is also to be observed that the heel hold-down device of unit C used in the method hereindescribed, may be modified without departing from the salient features of the invention. And, it will also be observed that the lock-pin positioning device of unit C used in the method hereindescribed, may be modified without departing from the salient features of the invention.

The many advantages of the herein described method of heeling shoes, over the present day method of nailing wooden heels to shoes, will readily suggest themselves to those skilled in the art to which it appertains.

What I claim is:

1. The method of heeling a shoe, which consists of cutting to shape the heel seat portion of the outsole of a shoe, attaching a pronged heel seat plate having apertured ears under pressure to the heel seat of the shoe and simultaneously therewith finally shaping the heel seat of the shoe, applying a wooden heel having transverse recesses to the heel seat of the shoe with the apertured ears of the plate insertable in the recesses of the heel, applying pressure to the heel, inserting a pin in a breast opening of the heel and applying pressure to the pin for moving it into interlocking engagement with the apertured ears of the heel seat plate.

2. The method of applying wooden heels to the heel seats of lasted shoes supported by a jack, which consists of cutting the heel seat portion of the outsole to form, applying a pronged heel seat plate having apertured ears to the heel seat of the lasted shoe under pressure, applying a heel to the plate with the ears of the plate insertable into recesses in the heel seat surface of the heel, applying pressure to the heel and while said pressure is still applied, applying a lock-pin to the heel through a breast opening therein and applying pressure to said pin for interlocking it with the apertured ears of the heel seat plate for holding the heel in position on the heel seat of the shoe.

3. The method of heeling shoes characterized by securing under pressure pronged means to the heel seat of a lasted shoe and simultaneously therewith finally shaping the heel seat of the shoe, positioning a shoe heel on said means, applying pressure to the heel in its applied position and positioning a lock-pin through a breast opening in the heel for interlocking engagement with apertured parts of said pronged means for holding the heel against displacement upon the heel seat of the shoe.

4. The method of heeling shoes, which comprises applying a unitary pronged metallic plate having apertured ears by forcing the prongs of said plate through the heel seat material of the shoe and clinching same to the insole of the shoe under pressure, positioning a heel on the heel seat plate with the apertured ears thereof inserted into slotted recesses in the heel seat surface of the heel, applying pressure to said heel to forcibly seat the same on the heel seat material of the shoe and inserting a pin under pressure through an opening in the heel for interlocking engagement with the apertured ears of the metallic plate for locking the heel in position on the shoe.

5. The method of heeling shoes, which consists in supporting a lasted shoe to be heeled, gauging the shoe as to location relative to a cutting die, cutting the heel seat portion of the outsole of the shoe, resupporting and regauging the lasted shoe, applying a heel seat plate under pressure to the lasted shoe and locking the heel seat plate to the initially formed heel seat of the shoe and therewith finally shaping the heel seat of the shoe, applying a heel to the heel seat plate with apertured parts thereof receivable in slotted recesses in the heel seat surface of the heel, positioning the lasted shoe on a third support, applying pressure to the tread surface of the applied heel to hold it tightly against the heel seat of the shoe and finally forcing a lock-pin into a breast opening in the heel for interlocking engagement with the apertured parts of the heel seat plate for locking the heel to the shoe.

6. The method of applying heels to shoes which is characterized by mounting a lasted shoe on a support below a cutting die, gauging the location of the heel seat of the shoe, cutting the heel seat portion of the outsole of the shoe to shape, remounting the lasted shoe on another support, applying and securing a heel attaching plate to the heel seat of the shoe and therewith finally shaping the heel seat of the shoe, remounting the lasted shoe on a third support, applying pressure to the heel and forcing same against the heel seat of the shoe and while said pressure is still applied positioning the entering end of a locking-pin into the mouth of a breast opening directed into the heel and finally forcing the locking-pin into the opening for interlocking engagement with apertured parts of the heel attaching plate for locking the heel to the shoe.

7. The herein described method that consists in connecting together a shoe and a heel therefor, in a series of operations, positioning a lasted shoe on a support with the heel seat portion thereof below a cutting die to trim the heel portion of an outsole to heel seat formation, repositioning the shoe on another support, applying a heel attaching plate and securing the plate to the heel seat of the shoe and finally shaping the heel seat with the plate thereon, remounting the lasted shoe on a third support, applying a heel to apertured parts of said plate which are receivable in slotted recesses in the heel, applying pressure to the heel and while pressure is still applied forcing a lock-pin into a breast opening in the heel for interconnecting the pin with the apertured parts of the heel seat plate for securely holding the heel to the heel seat of the shoe.

8. In the method of heeling ladies' shoes, the mounting of a lasted shoe on a support, preparing the heel portion of the outsole of the shoe to fit the heel seat of the heel, remounting the lasted shoe on another support, applying a heel attaching plate having securing prongs and a pair of transverse apertures ears to the heel seat of the shoe under pressure to cause the prongs of the plate to penetrate the heel seat material to be clinched against the insole of the shoe, remounting the lasted shoe with the heel attaching plate thereon on another support, positioning a cemented heel to the heel seat of the shoe with the apertured ears receivable in transverse slotted recesses of the heel, applying pressure against the tread surface of the heel to cause the apertures of the ears of the heel attaching plate to register with a breast opening in the heel, positioning a lock-pin in the mouth of the breast opening of the heel and applying pressure to said lock-pin to ram the lock-pin into interlocking connection with the apertured ears of the heel seat plate.

9. In the method of heeling ladies' shoes, the mounting of a lasted shoe on a support, preparing the heel portion of the outsole of the shoe to fit the heel seat of the shoe, applying a pronged heel attaching plate to the heel seat of the shoe and exerting sufficient pressure thereagainst to force the prongs of the plate through the heel seat material and to clinch the prongs against the insole of the shoe, applying a wooden heel to the heel attaching plate, positioning a lock-pin in a breast opening of the heel, applying pressure to the lock-pin to force the same into the breast opening for interconnection with apertured parts of the heel seat plate which are insertable in slotted recesses in the heel seat surface of the heel.

10. The method of heeling shoes, which consists in cutting to shape the heel seat portion of the outsole of a shoe, applying a heel attaching plate having apertured ears under pressure to the heel seat in a single operation and therewith shaping the heel seat, assembling a heel having recesses relative to the plate with the apertured ears receivable in the recesses in the heel, applying pressure to the heel, inserting a pin in a bore in the heel and forcing same through the apertured ears while the heel is under pressure, releasing the pressure on the heel and utilizing the resiliency of the plate and the natural tendency of the heel to move outwardly to bind the pin with the apertured ears to rigidly hold the heel against displacement relative to the heel seat.

11. The method of heeling shoes which consists in permanently attaching under uniform pressure a unitary metallic heel attaching plate having apertured tangs to a prepared heel seat of a shoe, releasing the pressure from the plate, positioning a heel having slotted recesses on the plate so that the apertured tangs will be received in the heel recesses, applying uniform pressure to the heel, forcing a locking pin into a bore in the heel and through the apertures in the tangs while the heel and the plate are under pressure, and releasing the pressure on the heel to utilize the resiliency of the plate and the natural tendency of the heel to spring outwardly to bind the locking pin in the tangs on the attaching plate in such a way that the heel is clamped rigidly against the attaching plate and the heel seat portion of the sole adjacent the edge of the attaching plate.

12. In the art of making shoes, the process which consists in permanently attaching a unitary metallic heel attaching plate to a prepared heel seat of the shoe, said plate having prongs with beveled edges to penetrate the heel seat material under uniform pressure and clinched to the inner face of the heel seat portion of the shoe, while under such pressure, said plate having ears provided with axially aligned openings, assembling a heel relatively to the plate with the plate ears receivable in recesses in the base of the heel, the heel having a bore open to the breast thereof, applying uniform pressure to the heel to cause a tight union of the heel with the plate and the heel with the edge of the heel seat material surrounding the plate and to cause the heel bore to register with the aligned plate ear openings, inserting a pin in the heel bore and through the ear openings while the heel is under pressure and releasing the pressure on the heel utilizing the resiliency of the metal plate and the natural tendency of the heel to move outwardly to bind the pin in the ear openings and effect a rigid mounting for the heel relative to the heel seat to preclude displacement of the edge of the heel to the corresponding edge of the heel seat of the shoe.

13. The method of applying heels to shoes which is characterized by securing a unitary heel attaching plate having marginal prongs and a pair of oppositely directed ears provided with openings to the heel seat of a lasted shoe positioned upon a support, positioning a heel having recesses to receive said ears on said heel attaching plate, applying pressure against the heel and while under such pressure forcing a lock pin into an opening in the heel and through openings in the ears of the heel attaching plate for securing the heel to the shoe.

14. The method of applying heels to shoes which is characterized by securing pronged means to the heel seat of a lasted shoe under pressure and therewith finally shaping the heel seat of the shoe, positioning a heel on said means, applying pressure to the heel and during the application of said pressure positioning a lock pin through an opening in the heel for interlocking engagement with apertured parts on said pronged means for firmly holding the heel against displacement on the heel seat of the shoe.

15. The method of applying heels to shoes which is characterized by securing a pronged plate to the heel seat of a lasted shoe under pressure and therewith finally shaping the heel seat of the shoe, positioning a heel on said pronged plate, applying pressure to the heel and during the application of said pressure positioning a lock pin through an opening in the heel for interlocking engagement with apertured parts on said pronged plate for firmly holding the heel against said plate and the heel seat material of the shoe bounding the edges of said plate.

16. The method of applying heels to shoes which is characterized by first positioning a lasted shoe on a support, applying a heel attaching plate having marginal prongs and oppositely directed apertured ears to the heel seat of a shoe and forcing the prongs under pressure through the folded over upper, lining and the insole of the shoe and clinching the prongs to the insole, second, positioning a heel having slotted recesses upon the plate with the apertured ears on the plate insertable into the recesses, third, applying pressure against the heel to register the apertures in the ears on the plate with an opening in the heel, and, fourth, while the heel is under such pressure inserting a pin into the heel opening for interlocking engagement with the apertured ears on the plate.

FRANK B. DOPP.